UNITED STATES PATENT OFFICE.

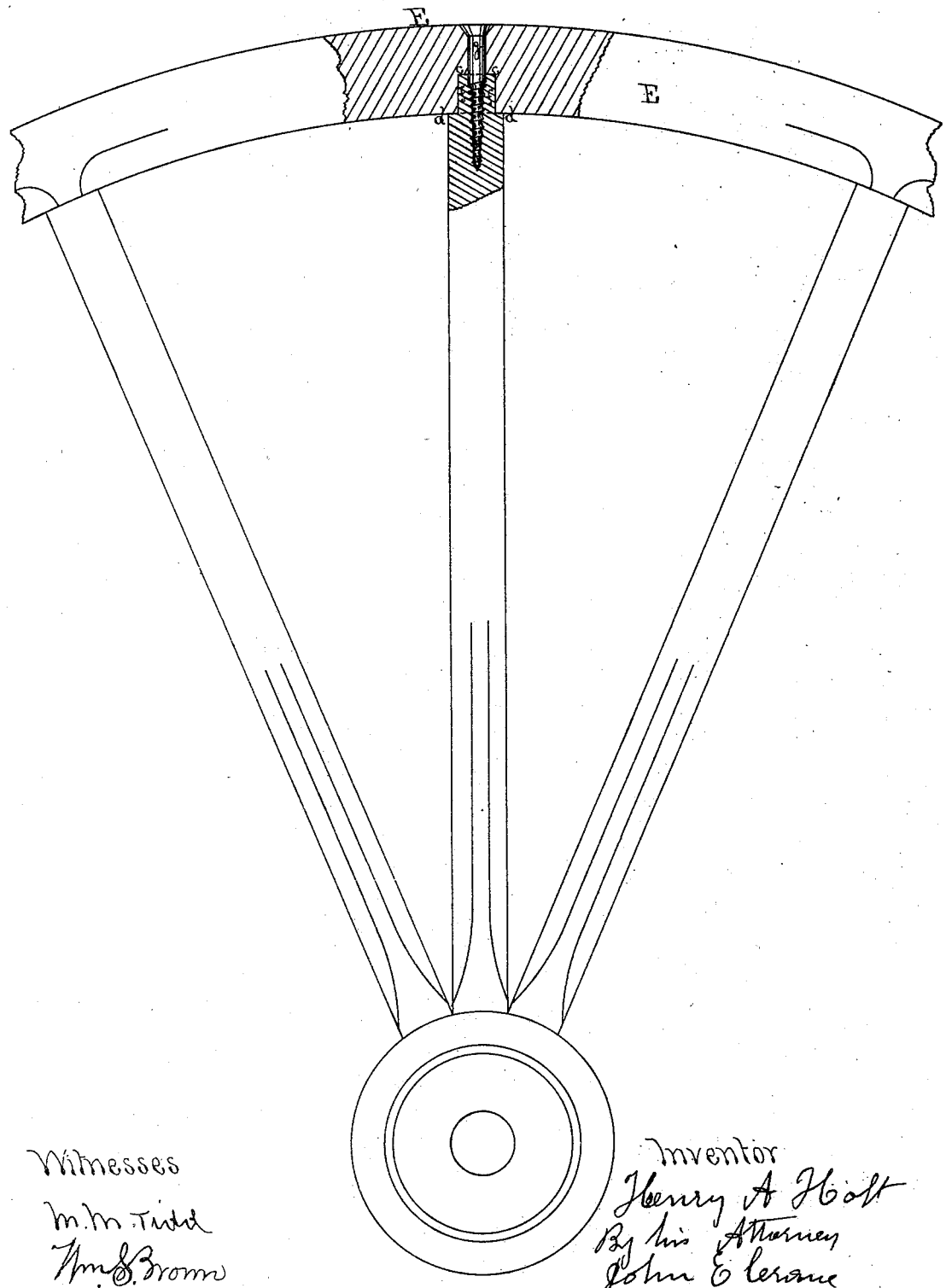

HENRY A. HOLT, OF WILTON, NEW HAMPSHIRE.

IMPROVEMENT IN SPOKE-SOCKETS.

Specification forming part of Letters Patent No. 170,732, dated December 7, 1875; application filed February 26, 1874.

*To all whom it may concern:*

Be it known that I, HENRY A. HOLT, of Wilton, in the county of Hillsborough and State of New Hampshire, have invented a new and useful Improvement in Carriage-Wheels, of which the following is a full, clear, and exact description, reference being had to the accompanying drawing, making part of this specification.

This invention has for its object to furnish a carriage-wheel that shall be very strong and durable, to strengthen the rim and diminish the liability of splitting or breaking down at the joint or junction of the rim with the spoke; to strengthen the spoke; to hold more firmly the rim to the spoke; to prevent the spoke wearing into the rim by the whole end surface of the spoke, as also the shoulder, having solid bearings, instead of the shoulder alone, and both the shoulder and the spoke end held firmly against their bearing-surfaces by screws passing through the rim and well into the end of the spokes, thus holding the rim to the spoke after the tire becomes loose in a greater or less degree.

In the manufacture of carriage-wheels it is common to bore the rim and insert the spokes entirely through it, and then secure the spokes to the rim by wedges, which split the spoke-tenons. This mode or means of securing the spokes weakens both the spokes and the rim, which is objectionable.

A wagon-wheel may have been made with the spoke-tenons inserted in the rim, and only part way through it, but with no special end bearing, and no device to hold either the shoulder or the end of the spoke-tenon against bearing-surfaces; and the short spoke-tenon could not be wedged with any degree of certainty or success, and if wedging was attempted it would be almost certain to split the spoke-tenon, and for some distance into the spoke beyond the tenon, which would also be objectionable.

To obviate the aforesaid difficulties, and to produce a very strong and durable carriage-wheel, as set forth in the objects of my invention, I bore the hole or socket for the spoke-tenon about half-way through the rim from the inner periphery. I then fit the spoke-tenon of the precise length of the depth of the hole or socket, and so close that the rim must be pressed or driven onto each spoke-tenon with considerable force, when both the shoulder *d* of the spoke-tenons *f* and their ends *c* come to solid bearings, as shown. I then bore small holes through the rim E, directly opposite to the center of each spoke-tenon; or, preferably, such holes are bored and countersunk for screw-heads before the tenons are inserted in the rim. I then bore still smaller holes in the ends of the spokes, and insert a screw, *g*, in each hole, and well into the end of each spoke-tenon, turning the head of each screw well into its countersink in the rim, and, if possible, draw the shoulders and the ends of the spoke-tenons more firmly against their bearing-surfaces, and holding the parts securely together.

A wheel thus made will be stiff, firm, and strong, and less liable to spring or get out of shape before the tire is set; and, as it is common to make carriage-wheels in large numbers and lay them aside to season before setting the tires, I have found it greatly advantageous and profitable to make my carriage-wheels as I have described, and with screws to hold the spoke and rim sections or fellies firmly together.

I disclaim the construction described in Letters Patent No. 37,823, dated March 16, 1869, and that described in Letters Patent No. 146,295, dated January 6, 1874.

I claim—

In a carriage-wheel, the combination of a rim, having spoke mortises or sockets bored only partly through the same, spokes having tenons bearing against the bottoms of their mortises, and their shoulders against the inner periphery of the rim, and screws driven through the outer periphery of the rim into the ends of the spokes, all substantially as and for the purpose set forth.

HENRY A. HOLT.

Witnesses:
MOSES CLARK,
WM. EMERSON.